(12) United States Patent  
Thibodeaux

(10) Patent No.: US 7,290,755 B1
(45) Date of Patent: Nov. 6, 2007

(54) TRAILER HITCH METHOD AND APPARATUS

(76) Inventor: Gregory Thibodeaux, 1073 John Hebert Rd., Breaux Bridge, LA (US) 70517

( * ) Notice: Subject to any disclaimer, the term of this patent is extended or adjusted under 35 U.S.C. 154(b) by 309 days.

(21) Appl. No.: 11/165,885

(22) Filed: Jun. 24, 2005

(51) Int. Cl.
*B66D 1/00* (2006.01)

(52) U.S. Cl. ............... 254/323; 280/479.1; 280/479.3; 280/477

(58) Field of Classification Search ............... 254/323, 254/326; 280/479.1, 479.2, 479.3, 480, 480.1, 280/491.2, 494
See application file for complete search history.

(56) References Cited

U.S. PATENT DOCUMENTS

| | | | | |
|---|---|---|---|---|
| 2,150,010 A | * | 3/1939 | Guillermo | 280/477 |
| 3,761,113 A | * | 9/1973 | Smitherman | 280/479.3 |
| 3,848,895 A | * | 11/1974 | Christopher | 280/478.1 |
| 3,938,122 A | * | 2/1976 | Mangus | 340/431 |
| 4,042,254 A | * | 8/1977 | Allen | 280/479.3 |
| 4,466,632 A | * | 8/1984 | DeVorak | 280/479.3 |
| 4,807,899 A | | 2/1989 | Belcher | |
| 5,048,854 A | | 9/1991 | Clark | |
| 5,072,962 A | * | 12/1991 | Webb | 280/414.1 |
| 6,386,514 B1 | | 5/2002 | Ray | |
| 6,494,477 B1 | | 12/2002 | Parker | |
| 6,511,089 B1 | * | 1/2003 | Kores, Sr. | 280/478.1 |
| 6,948,734 B2 | * | 9/2005 | Popham | 280/478.1 |

* cited by examiner

*Primary Examiner*—Emmanuel M Marcelo
(74) *Attorney, Agent, or Firm*—Robert N. Montgomery

(57) ABSTRACT

A fully integrated, self-contained, retrieving trailer hitch for use in coupling heavy laden trailers to large SUV's and RV's. The self-contained module is capable of being plugged directly into a vehicle tow bar hitch receiver and connected to the vehicle's electrical power supply. The module-retrieving hitch contains an integral retracting take-up reel with a cable extending through the docking housing and connected to an extendable docking guide member. The docking member which may be double reeved and adapted for removable connection to ball hitch assemblies generally used for insertion within vehicle tow bar receivers for coupling to a trailer hitch member. The docking guide member automatically locks the guide member within the docking housing upon docking. An interlock is provided for unlocking the docking member.

20 Claims, 8 Drawing Sheets

TRAILER HITCH METHOD AND APPARATUS

FIELD OF THE INVENTION

This invention relates generally to trailer hitches and more particularly to self-coupling trailer hitches used in drawing heavy trailers to the vehicle and automatically latching the hitch assembly into the vehicle receiver assembly.

GENERAL BACKGROUND

It has long been established, and well documented within the art, that a winch and cable arrangement located integral with or adjacent to a vehicle trailer hitch assembly or coupling receiver that may be utilized to tow a heavy laden trailer to the vicinity of the vehicle ball hitch or receiver for coupling or guided into the receiver itself for coupling.

In most cases where receiver docking systems are utilized the prior art teaches the need to locate a manual or electrically operated winch to the vehicle adjacent the receiver member with the draw cable extending through the receiver member and coupled to a guide member having a hitch ball or other means for connecting to a trailer. It is generally assumed that such docking systems and the winch assembly are to be custom fitted to the vehicle by cutting and welding as necessary to accommodate the wide variety of vehicles used for towing. This is especially true in locating the winch assembly. Mounting the winch assembly in a concealed manner below the vehicle is made more complicated due to the location of the vehicle spare tire. Spare tire location also necessitates complicated hitch mountings for the vehicle receiver as well. Mounting the winch on the receiver or an extended plug-in receiver further complicates the use of a docking and latching process and increases the bulk of the hitch assembly and thus prohibits opening rear doors and poses a safety hazard. In most cases it is assumed that a self-docking winch assembly will be custom mounted beneath the vehicle and in a manner whereby the cable can be extended to pass though the receiver member. Since a docking hitch only needs a few feet of cable for coupling, it seem unnecessary to provide a large expensive cable winch for this purpose. However, it is certainly known within the art that cable winches alone may be attached to a receiver in a plug-in manner but are not known to be an integral essential element of the hitch assembly.

Further, the hitch docking process simplifies the coupling process but still requires a locking procedure, such as aligning the couplings within the receiver for insertion of a locking pin. Such pins may be lost or become bent and thus hard to remove or insert.

The prior art does not teach the use of a fully integrated unit combining a retrieval winch and cable or docking assembly in a self-contained module that can be plugged into a vehicle receiver hitch and provide for automatically locking the cable or docking assembly.

SUMMARY OF THE INVENTION

A fully integrated, self-contained, plug-in type automatic locking trailer hitch, docking module for use in coupling heavy laden trailers to large SUV's and RV's. The self-contained module is capable of being plugged into a vehicle hitch receiver and connected to the vehicle's electrical power supply. The module contains an integral retracting take-up reel with a cable extending through the docking housing and connected to an extendable docking guide member including hitch ball for coupling to a trailer hitch member. The docking guide member automatically locks the guide member within the docking housing upon docking. An interlock is provided for unlocking the docking member. Safety lock may also be attached to prevent accidental release or theft. The module may be easily removed from the vehicle receiver for storage when not in use. Remote control and self-locking ensures operator safety by eliminating the need to stand between the trailer and vehicle during the docking or undocking procedure and inserting locking pins etc.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein.

DETAILED DESCRIPTION OF THE PREFERRED EMBODIMENT

Figure 1:
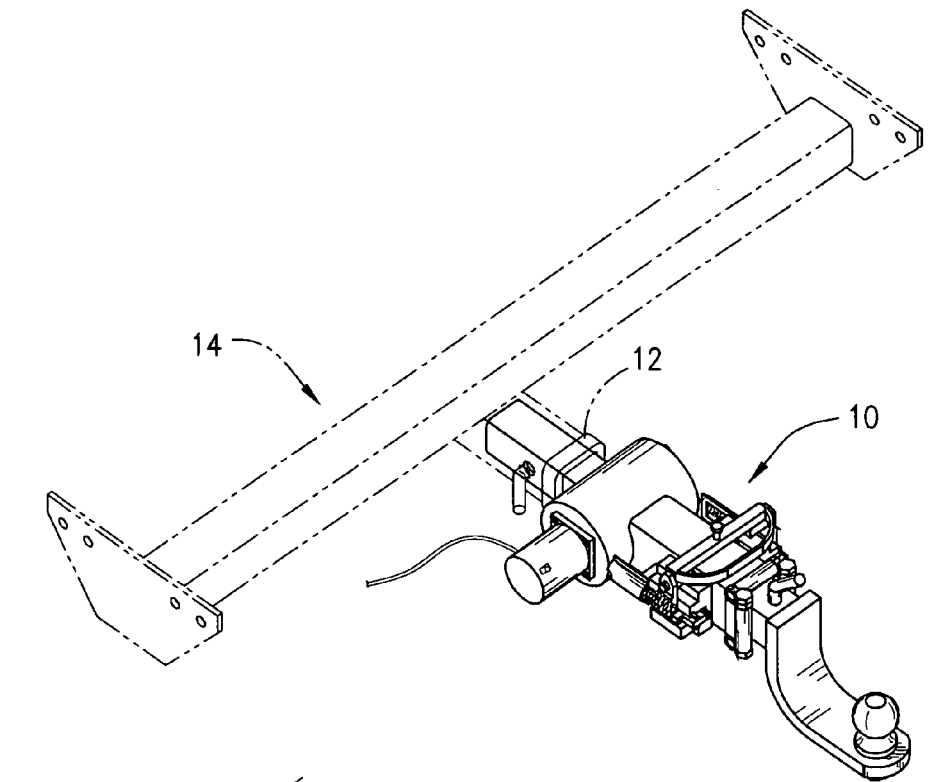
FIG. 1 is an isometric view of the hitch assembly retracted and latched.
Figure 2:
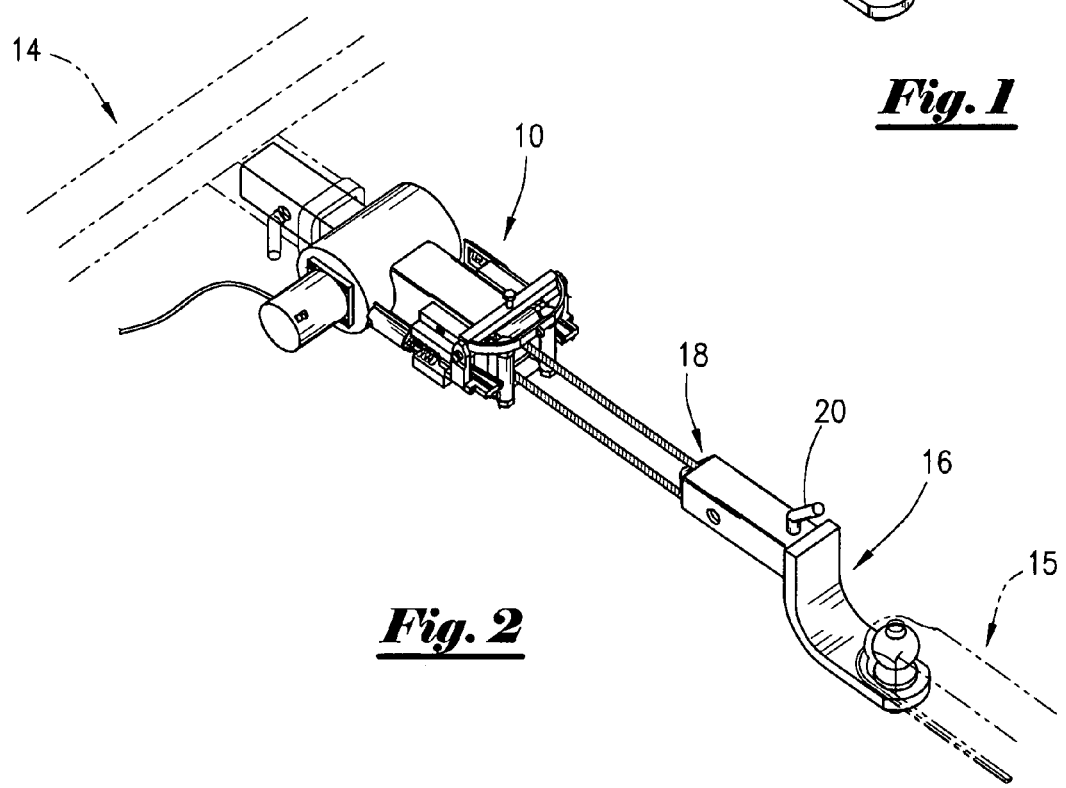
FIG. 2 is an isometric view of the hitch assembly unlatched and extended.

As first seen in FIG. 1, the self contained, retrieving hitch assembly 10 simply plugs into the primary receiver member 12 of a vehicle tow bar assembly 14 and pinned thereto in the customary manner. This allows the retrieving hitch assembly 10 to be removed from the vehicle tow bar assembly 14 when not in use. Further, the trailer ball and stinger assembly 16 as seen in FIG. 2, shown attached to the trailer coupling assembly 15, may be released from the cable docking member and cable or docking assembly 18 by removing the pin 20, thereby allowing the trailer ball assembly 16 to be used in the customary manner by plugging it directly into the tow bar's primary receiver member 12.

Figure 3:
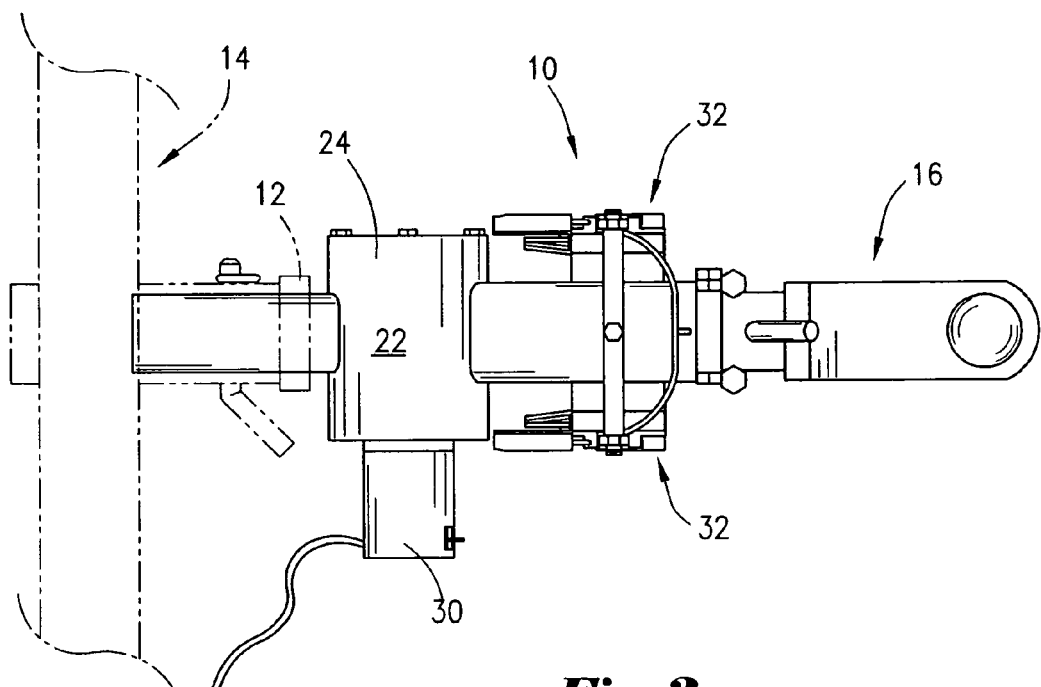
FIG. 3 is a top view of the hitch assembly retracted and latched.
Figure 4:
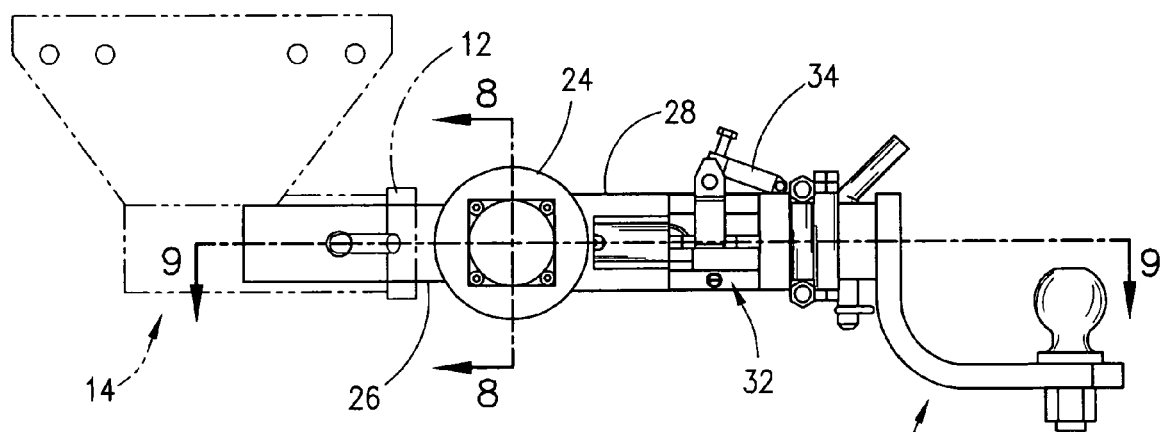
FIG. 4 is a side elevation view of the hitch assembly retracted and latched.

As shown in FIG. 3, the retrieval take-up reel assembly 22 is fully integrated into the retrieval hitch assembly 10 and is not simply a sub-component attached thereto. Therefore, the take-up reel assembly housing 24, as shown in FIG. 4, is an integral structural portion of the hitch assembly 10. The take-up reel housing 24 is structurally attached to the stub or stinger member 26, which is telescopically insertable within the primary receiver member 12. The stub or stinger 26 may be inline, as shown, or offset relative to the take-up reel housing 12 in some models to lower the hitch assembly 10 relative to the vehicle if desirable. The secondary receiver housing assembly 28 is also structurally attached to the take-up reel housing 24 perpendicularly to the central longitudinal axis of the take-up reel assembly 22. A drive member 30, as shown in FIG. 3, provides for extension and retraction of the cable or docking assembly 18 and trailer ball assembly 16. The drive member 30 may be a manual ratchet and pawl assembly, a pneumatic or hydraulic motor assembly or, preferably, an electric motor, possibly with a remote control.

The secondary receiver assembly 28 further includes a pair of automatic latching assemblies for pinning the trailer ball and stinger assembly 16 therein. Each of the latching assemblies 32 located on each side of the secondary receiver assembly 28 is biased to the locked or pinned position and is connected by a handle assembly 34.

Figure 5:
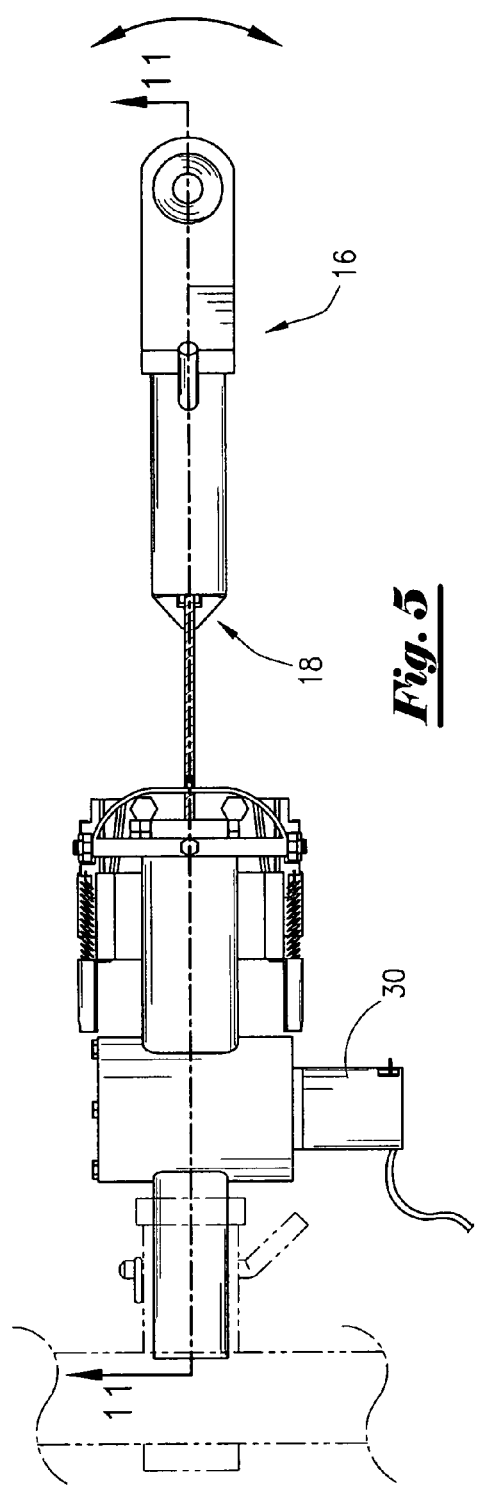
FIG. 5 is a top view of the hitch unlatched and extended.
Figure 6:
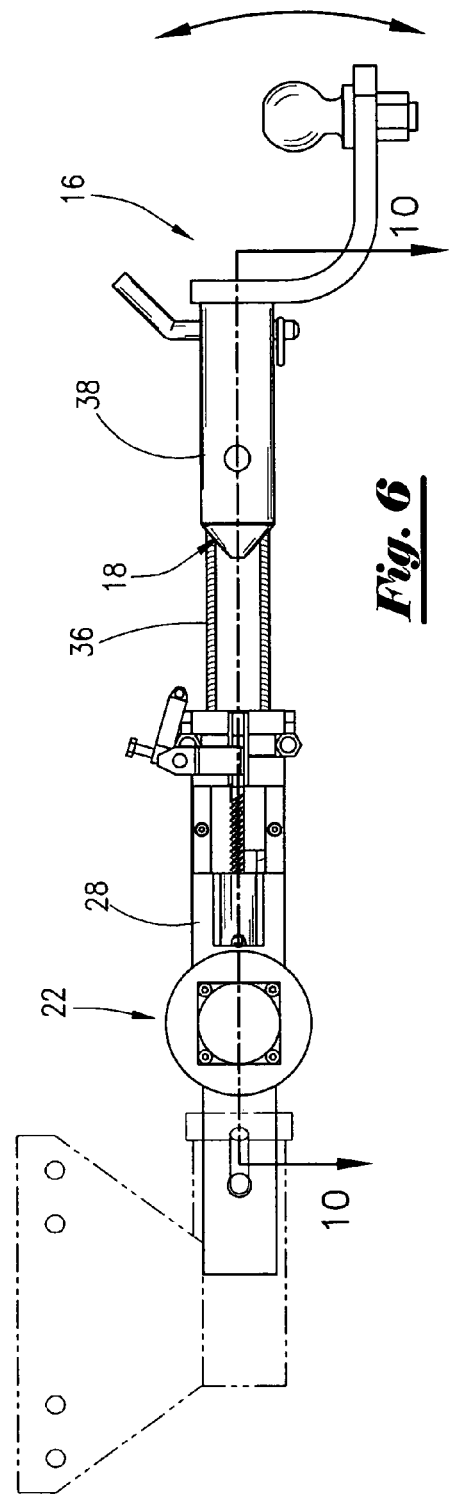
FIG. 6 is a side elevation view of the hitch assembly unlatched and extended.

Looking now at FIG. 5 and FIG. 6, we see that the cable or docking assembly 18 may be double revved to multiply the towing advantage of the take-up reel driver 30. In this case one end of the cable or other such flexible towing member 36 extends from the take-up reel assembly 22, where it is wound upon a take-up reel, through the secondary receiver 28, passed around a pulley located inside the tubular stinger member 38 of the ball assembly 16 and returns to the secondary receiver 29 where it is secured therein. It should be noted that this arrangement still allows the ball assembly 16 to be flexible in all planes.

Figure 7:
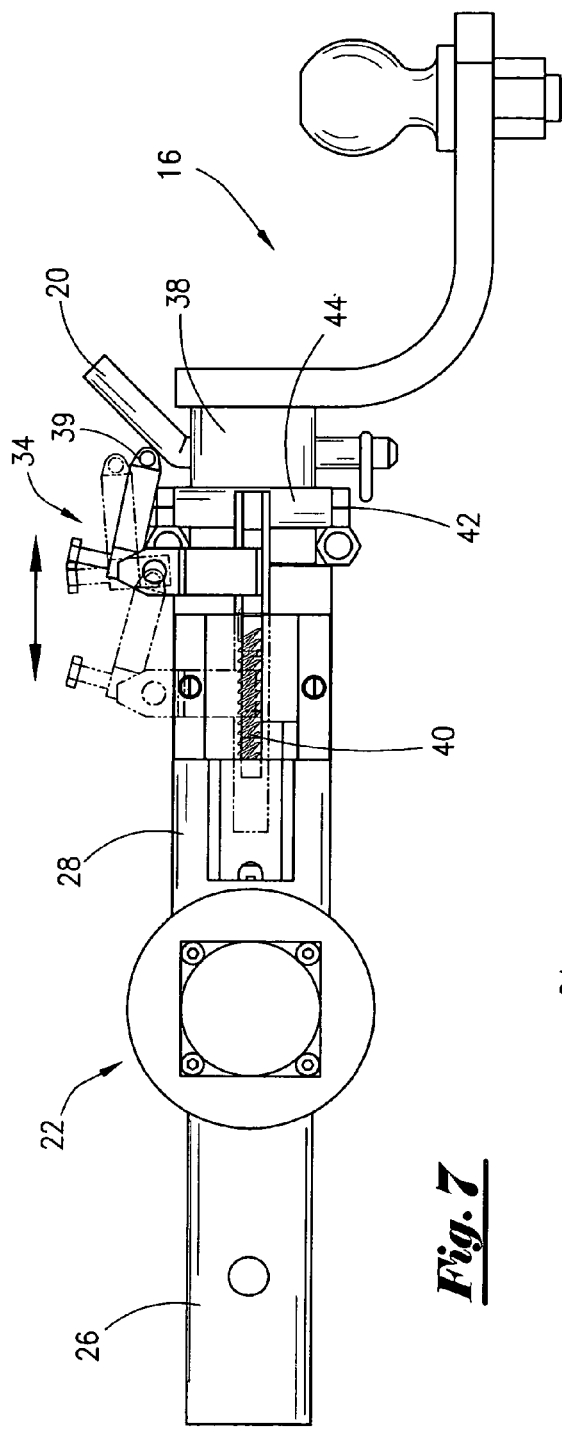
FIG. 7 is a side elevation view of the hitch assembly showing latch positions.

As shown in FIG. 7, the auto-latching handle assembly 34 is biased by springs 40 towards the latched or pinned position. Therefore, when unlatched and extended, the springs 40 are extended and the pivotal latch handle 39 is retained in the unlatched position by placing the handle 39 over the ends of the fairing pins 42 which extend through the fairing rollers 44. When the stinger 38 is retracted into the secondary receiver 28, the pull-pin 20 contacts the handle assembly 34 and thus forces the handle assembly upwards, allowing the springs 40 to retract the latches 32 and thus lock the stinger 38 within the secondary receiver 28.

Figure 8:
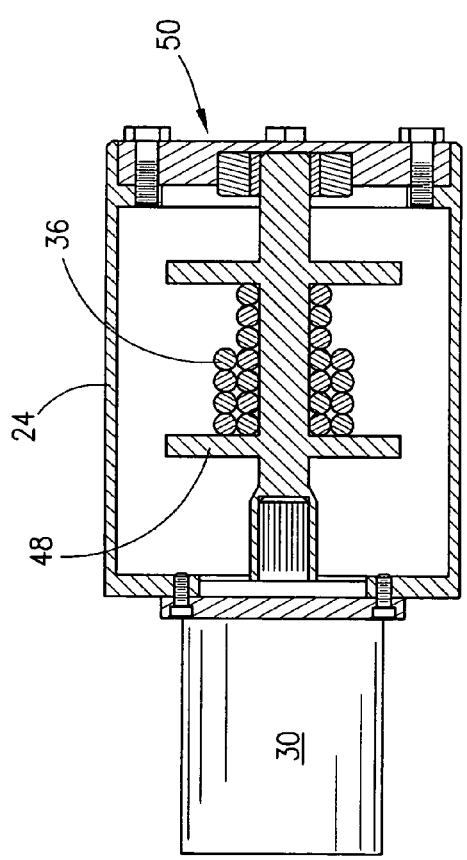
FIG. 8 is a cross section view of the take-up reel assembly taken along sight line 8-8 as shown in FIG. 4.

The take-up reel assembly 22 may be configured as seen in FIG. 8, wherein the driver 30 may be an electric gear motor attached to one end of the take-up reel housing 24 and coupled to the take-up reel or spool 48. A bearing plate assembly 50 supports the take-up reel 48 opposite the driver 30 and provides access to the take-up reel or spool 48 upon which the cable or other such flexible towing member 36 is wound and attached.

Figure 9:
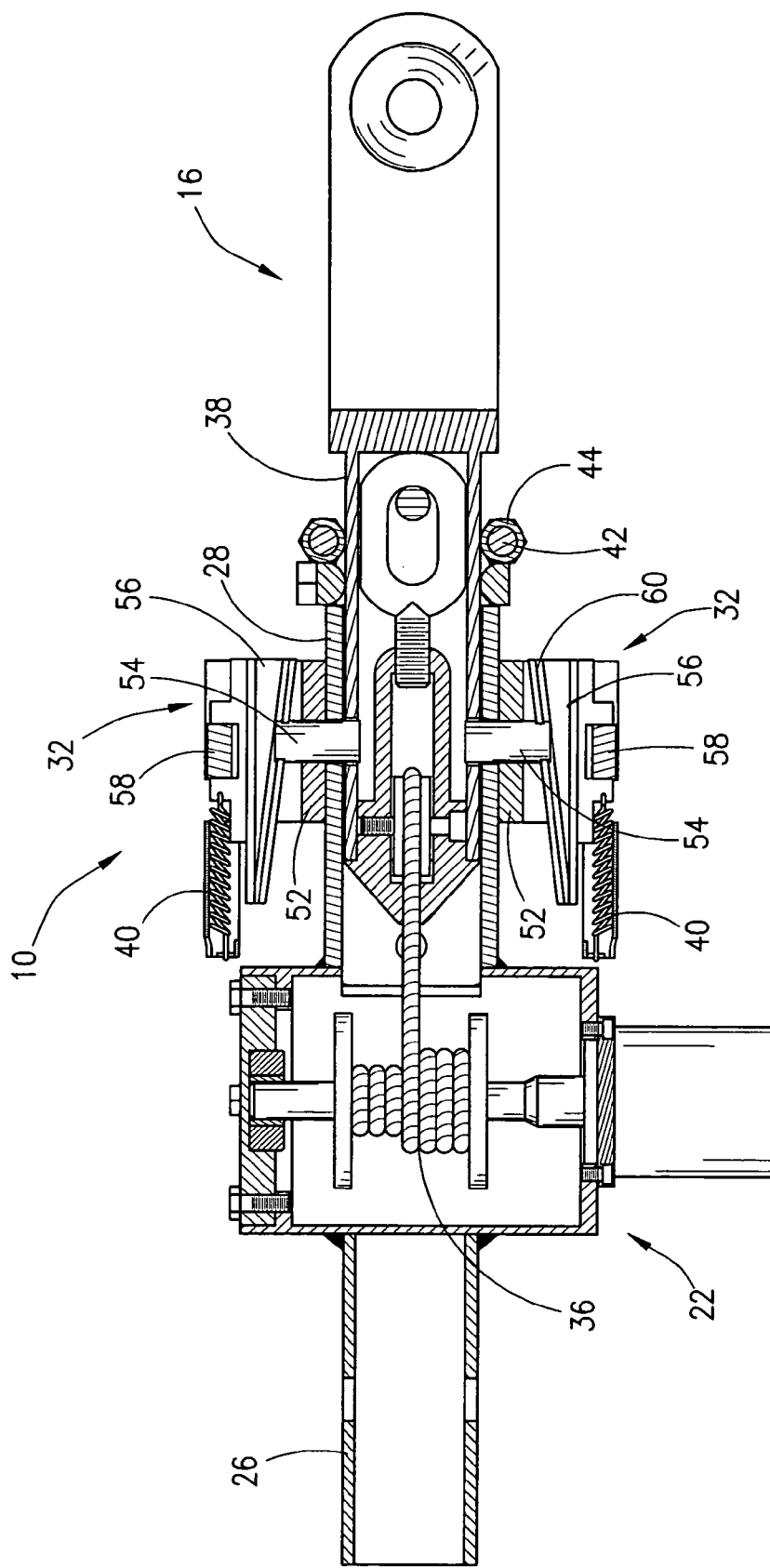
FIG. 9 is cross section view of the hitch assembly taken along sight line 9-9 as shown in FIG. 4.
Figure 10:
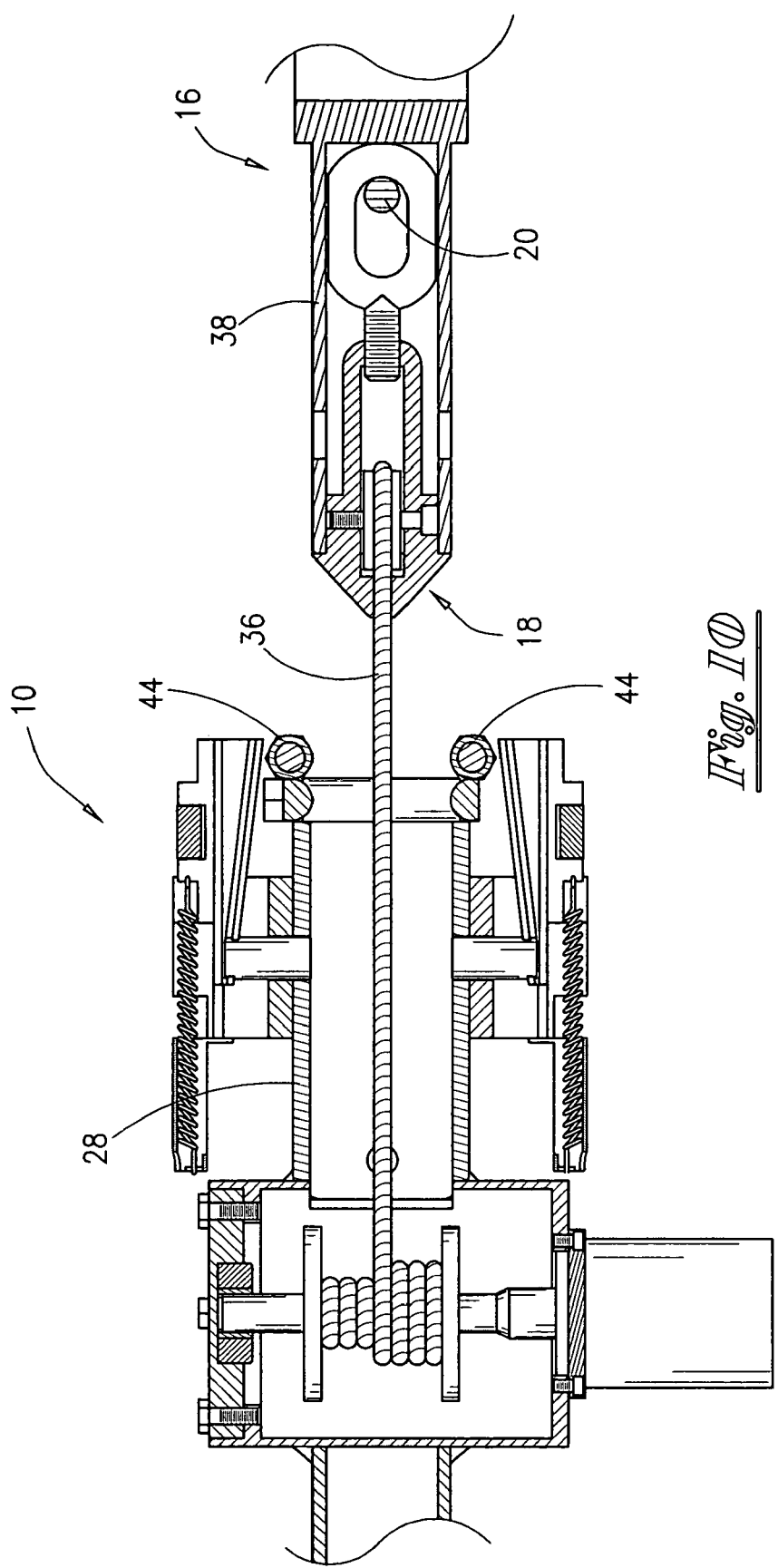
FIG. 10 is a horizontal cross section view of the hitch assembly taken along sight line 10-10 as shown in FIG. 6.

Looking now at FIG. 9 and FIG. 10, the hitch assembly 10 shown in cross-section illustrates the docked and un-docked positioning of the ball assembly respectively, further illustrating the method of latching the stinger assembly 16 within the secondary receiver 28 and providing a more comprehensive view of the cable or docking assembly 18. Looking first at the latching assemblies 32 located at each side of the secondary receiver 28 seen in FIG. 9, it can be seen that the latch assembly 32 includes a housing block 52 removably attached to the receiver 28, a pin member 54 extendable though an orifice located within the housing block 52 and the secondary receiver 28, a wedge shaped slide member 56 slidable within the housing block 52 and the pin member 54, a pivotal arm member 58 for manually manipulating the slide member 56, a spring 40 for urging the slide member 56 to the latched or pinned position whereby the pin member 54 extends into an orifice located in the stinger 38, and a handle member 39 for connecting the pivotal arm members 58 of each latch assembly 32. It can be seen that by having a diagonal tee-shaped slot in the end of the pins 54 corresponding to the tee-shaped inner edge 60 of the wedge-shaped slide member 56, any movement of the slide member 56 inserts or withdraws the pin member 54.

If the handle member 39 becomes damaged or lost, the pivotal arm members 58 may be used to manipulate the slide member 56 and pivoted downward between stops located on the block housing to lock the slide member 56 in position.

Figure 11:
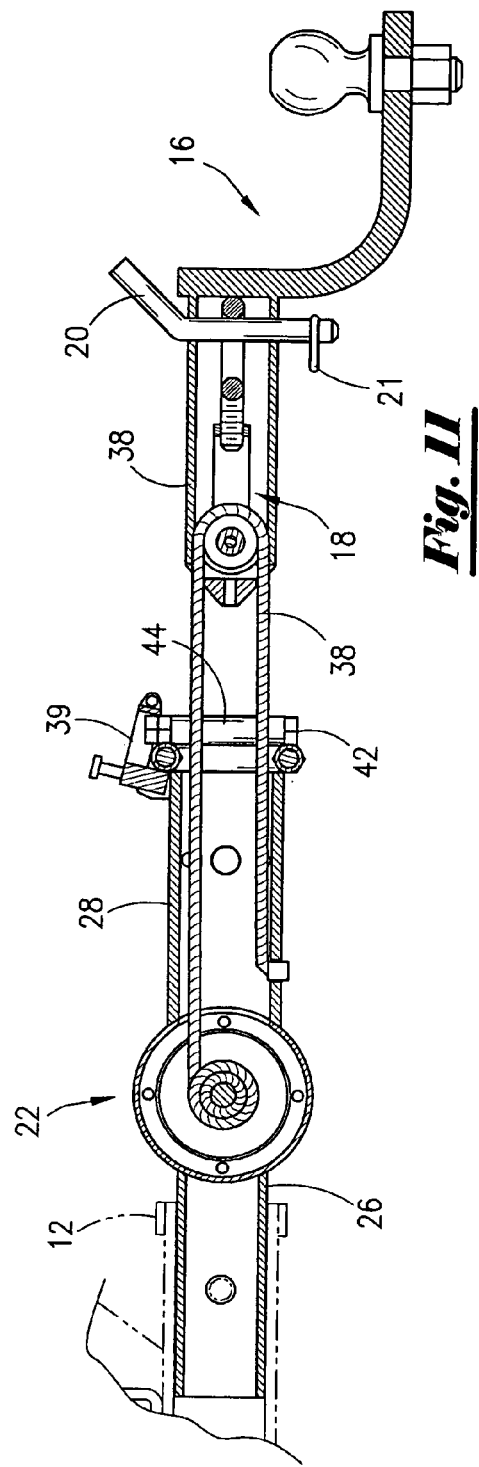
FIG. 11 is a vertical cross section view of the hitch assembly taken along sight line 11-11 as shown in FIG. 5.

As may be seen in FIG. 10 and FIG. 11, the cable or docking assembly 18 is inserted into the open end of the stinger member 38 and secured therein by the pull-pin 20 and retaining clip 21. The ball assembly 16 and the cable or docking assembly 18 are retrieved, guided and inserted into the secondary receiver assembly 28 by fairings 44.

Figure 12:
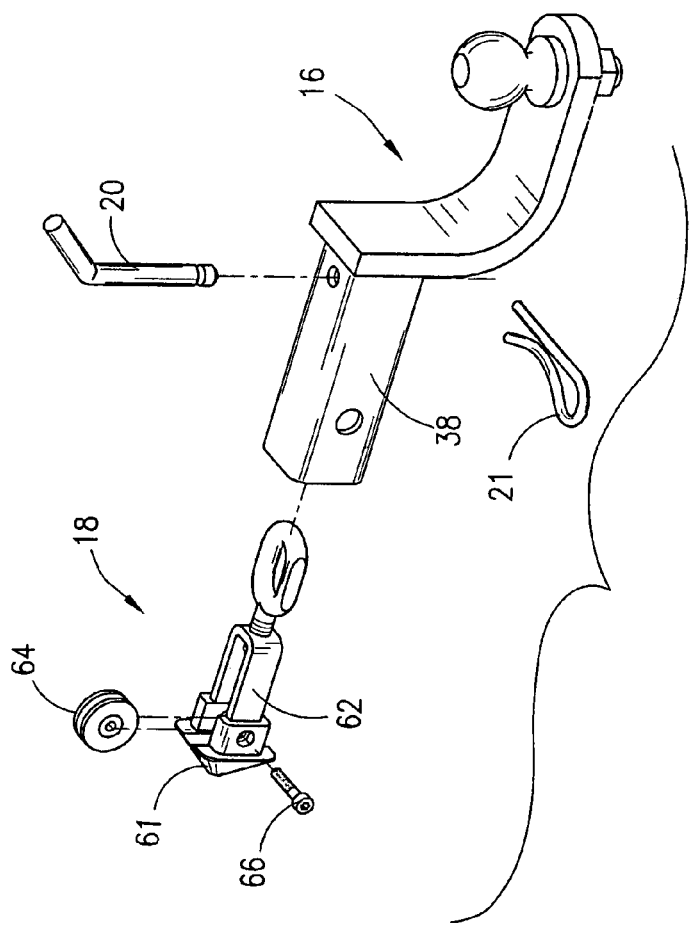
FIG. 12 is an exploded view of the hitch assembly and trailer ball and stinger assembly.

The cable or docking assembly 18 as shown in FIG. 12 includes the tapered nose member 61, a clevis 62 and a pulley 64 rotatable upon a spindle 66 attached to the back of the tapered nose member 61 and an eye bolt threadably attached to the clevis member 62. The tapered nose member 61 is notched to receive the cable 36 and thus allow free travel of the cable around the pulley when located within the stinger member 38. A central bore is provided through the tapered nose member 61 to allow for a single strand cable attachment if desired, as seen in FIG. 10.

It should also be noted that holes are provided in each side of the stinger member 38 to allow for insertion into and pinning within the primary receiver 12 when the retrieving hitch assembly 10 is not needed.

Figure 13:
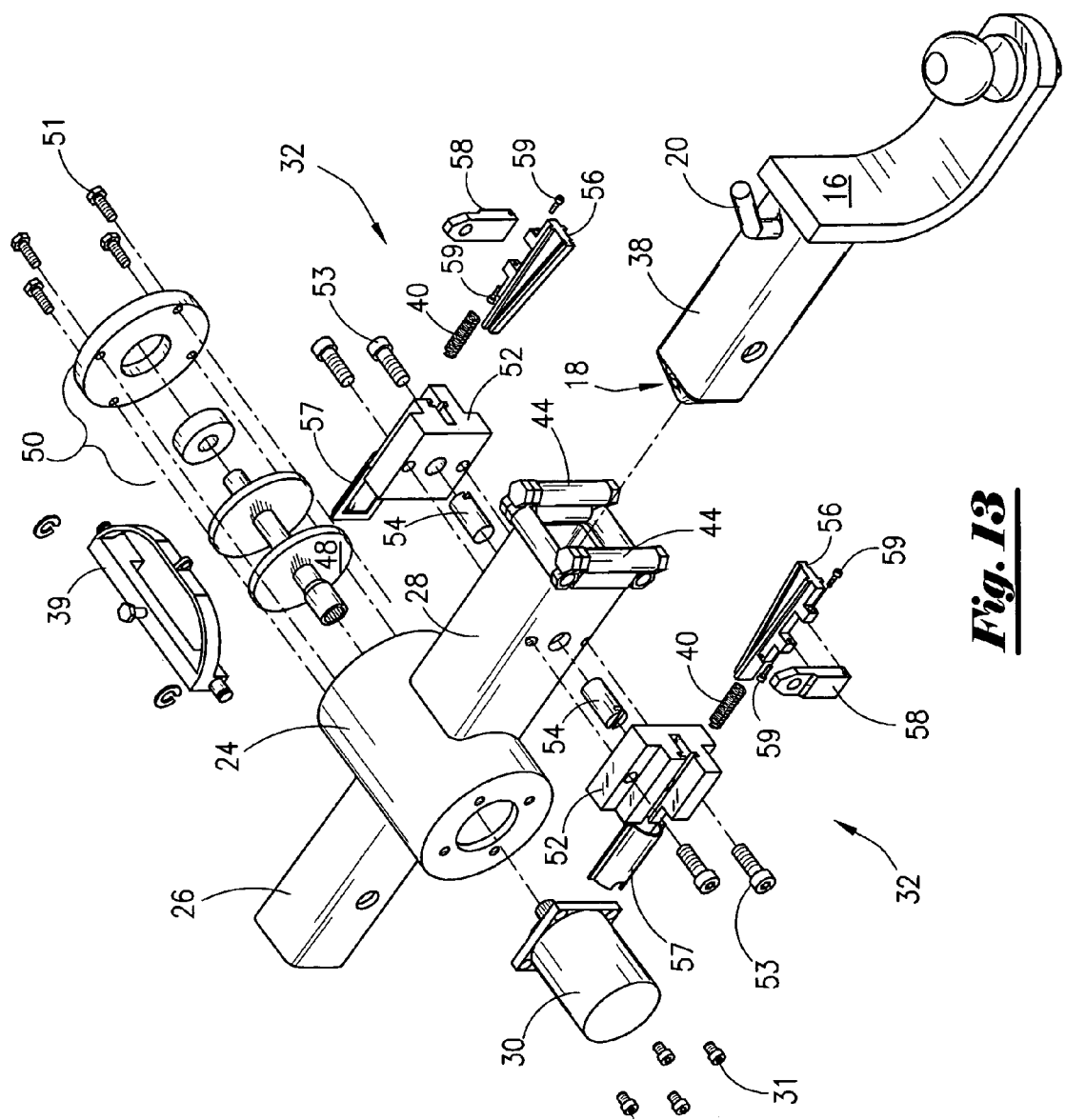
FIG. 13 is an exploded view of the hitch assembly as shown in FIG. 1.

An exploded view of the assembly 10, excluding the cable, is provided for a better understanding of the assembly in FIG. 13. First we see the base weldment consisting of the stub 26, which should be kept as short as possible and still keep the connection to the primary receiver 12, the take-up reel housing 24 and the secondary receiver, which also includes the fairings 44. Next we see the cable or docking assembly 18, retaining pin 20, and the ball assembly 16. Attachments are then added to the weldments 24, 38, which include the driver 30 secured by bolts 31, a take-up reel 48, bearing plate assembly 50 secured to the take-up reel housing 24 with bolts 51, the latch assemblies 32 which include the housing blocks 52 secured to the secondary receiver 28 with bolts 53, wedge shaped slide member 56 and its pivotal arm members 58 retained and pivotal about pins 59 and biased by springs 40 and the locking or latching pin 54. A spring cover may also be provided to protect the spring 40.

It should be clearly understood that the retrieving hitch assembly 10 is not a component of the vehicle tow bar assembly 14 and is only adaptive to such tow bars and that the trailer ball assembly 16 commonly used for coupling a trailer hitch 15 to the tow bar receiver 12 in this assembly is adapted to the retriever hitch assembly 10 by inserting and pinning the cable or docking assembly 18 to the ball assembly 16. Thus the retrieving hitch assembly 10 is exclusive of the vehicle tow bar and the ball hitch assembly 16 and is thus interchangeable with the ball hitch assembly.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A self-contained retrieving hitch assembly comprising:
   a) a stub member;

b) a take-up reel housing attached to the stub member;
c) a take-up reel assembly rotationally mounted within the take-up reel housing having a flexible member connected and wound thereon;
d) a means for driving the real assembly;
e) a docking member detachably connected to the flexible member; and
f) a receiver tube assembly attached to the take-up reel housing opposite the stub member having means for receiving and automatically locking the docking member thereto.

2. The self-contained retrieving hitch assembly according to claim 1 wherein said stub member, said take-up reel housing, and said receiver tube assembly are integral.

3. The self-contained retrieving hitch assembly according to claim 1 wherein said docking member comprises a tapered end and a clevis assembly adapted to fit telescopically within a stinger portion of a ball hitch assembly commonly used with tow bar assemblies.

4. The self-contained retrieving hitch assembly according to claim 3 wherein said tapered end is telescopically cooperative with said receiver tube assembly.

5. The self-contained retrieving hitch assembly according to claim 3 wherein said docking member further comprises a pulley.

6. The self-contained retrieving hitch assembly according to claim 5 wherein said flexible member is threadably passed though notches in said tapered end and around said pulley.

7. The self-contained retrieving hitch assembly according to claim 3 wherein said docking member further comprises an eye-bolt connected to said clevis assembly and a pin means for retaining said docking member within the stinger portion of a ball hitch assembly.

8. The self-contained retrieving hitch assembly according to claim 1 wherein said means for receiving and automatically locking said docking member comprises rotatable fairings located at the opening of said receiver tube assembly and latching blocks located along each side of said receiver tube assembly.

9. The self-contained retrieving hitch assembly according to claim 8 wherein said latching blocks each comprise:
a) a pin member slidable within an orifice;
b) a wedge-shaped slide member slidable within the latching blocks and the pin member,
c) a pivotal arm member attached to the slide member for manual manipulation; and
d) a biasing means for urging the slide member towards a latched position.

10. The self-contained retrieving hitch assembly according to claim 9 wherein said latching blocks comprise a handle member connecting the pivotal arm members of each latch assembly.

11. The self-contained retrieving hitch assembly according to claim 10 wherein said handle member is pivotal and latchable in a biased position whereby the pins are retracted.

12. The self-contained retrieving hitch assembly according to claim 11 wherein said handle member is unlatched by insertion of the stinger portion of a ball hitch assembly.

13. The self-contained retrieving hitch assembly according to claim 12 wherein said ball hitch assembly is interchangeable with said retrieving hitch assembly.

14. A self-contained retrieving hitch assembly comprising:
a) a take-up reel assembly;
b) a stub member attached to said take-up reel assembly for insertion within a tow bar box receiver;
c) a receiver assembly attached to said take-up real assembly;
d) a cable attached to and wound upon a rotatable take-up reel located within said take-up reel assembly extending through said receiver assembly;
e) a docking member insertable within said receiver detachably connected to said cable; and
f) an automatic locking means attached to said receiver assembly for connecting said docking member to said receiver assembly.

15. The self-contained retrieving hitch assembly according to claim 14 wherein said hitch assembly further comprises a means for driving said take-up reel.

16. The self-contained retrieving hitch assembly according to claim 14 wherein said docking member is adapted for insertion within a ball hitch assembly generally cooperative with a tow bar box receiver, said ball hitch assembly comprising a tubular stinger portion, a removable pin means for retaining said docking member, and a trailer bracket and ball assembly.

17. The self-contained retrieving hitch assembly according to claim 14 wherein said docking member further comprises a pulley and notches therein for double reeving said cable.

18. The self-contained retrieving hitch assembly according to claim 14 wherein said automatic locking means comprises a latch block located along each side of said receiver, each block comprising a pin member slidable within an orifice, a wedge-shaped slide member slidable within the latch blocks and the pin member, a pivotal arm member attached to the slide member for manual manipulation, and a biasing means for urging the slide member towards a latched position whereby the pin member is inserted through the walls of said receiver and said tubular stinger portion of said ball hitch assembly.

19. The self-contained retrieving hitch assembly according to claim 18 wherein said automatic locking means further comprises a handle assembly pivotally attached to each said pivotal arm member.

20. The self-contained retrieving hitch assembly according to claim 16 wherein said ball hitch assembly is interchangeably connectable with said retrieving hitch assembly and said tow bar box receiver.

* * * * *